Feb. 24, 1959  H. M. FOX  2,874,539
CONTINUOUS COMBUSTION POWER PLANT
Filed Dec. 28, 1953  2 Sheets-Sheet 1
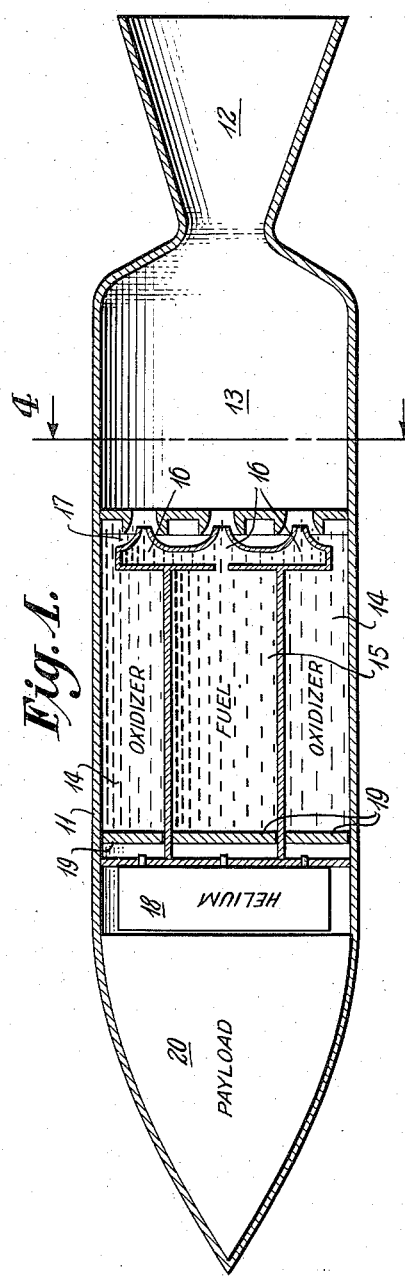
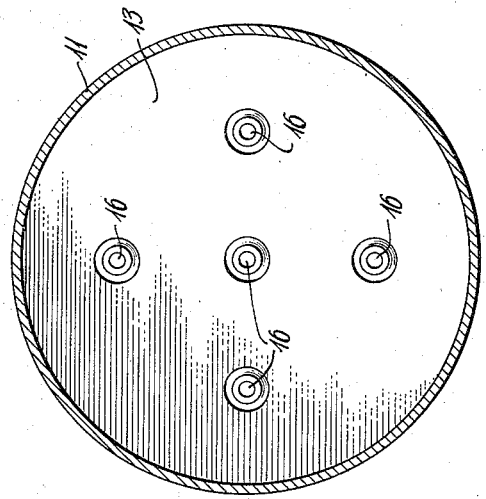
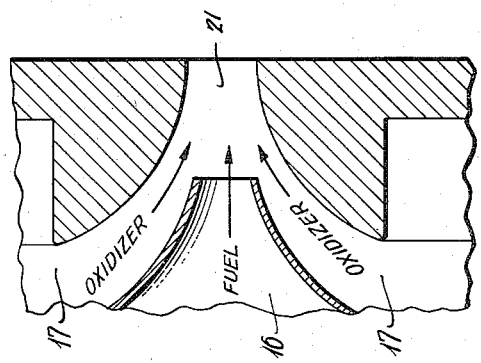
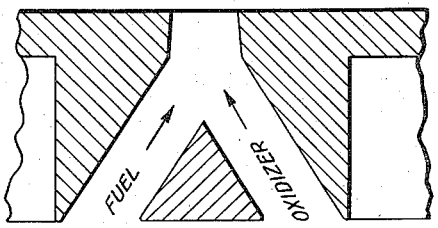
INVENTOR.
H. M. Fox
BY Hudson & Young
ATTORNEYS Feb. 24, 1959  H. M. FOX  2,874,539
CONTINUOUS COMBUSTION POWER PLANT
Filed Dec. 28, 1953  2 Sheets-Sheet 2

EFFECT OF PRESSURE ON IGNITION DELAY

INVENTOR.
H. M. Fox
BY
Hudson & Young
ATTORNEYS

United States Patent Office 2,874,539
Patented Feb. 24, 1959

2,874,539
CONTINUOUS COMBUSTION POWER PLANT

Homer M. Fox, Bartlesville, Okla., assignor to Phillips Petroleum Company, a corporation of Delaware Application December 28, 1953, Serial No. 400,442

3 Claims. (Cl. 60—39.02)

This invention relates to continuous combustion power plants. In one of its more specific aspects, it relates to an improved liquid fuel rocket motor. In another of its more specific aspects, it relates to a method and means for achieving maximum efficiency in a rocket motor wherein a liquid fuel is used which requires gentle mixing with the oxidizer for maximum combustion efficiency.

For a liquid bi-propellant motor, the ideal rocket motor postulates an injection system wherein the fuel and oxidizer are mixed perfectly, so that a homogeneous working substance results, which readily can be vaporized and burned.

Three types of injectors have been used. They are: (1) The impinging stream, multiple hole injector. In this system, the oxidizer and fuel, e. g., red fuming nitric acid-aniline are injected through a number of separate holes in such a manner that the resulting propellant streams intersect each other. A full stream will impinge with an oxidizer stream, and both streams will break up into small droplets. (2) Spray type injectors give conical, cylindrical, or other types of spray sheets of propellant fluids, e. g., red fuming nitric acid-aniline which intersect and thereby atomize and mix. (3) A nonimpinging injector is one wherein the fuel and oxidizer do not impinge, but mix largely by diffusion of propellant vapors and turbulence, e. g., fine particles of alcohol mix with gaseous oxygen.

The mechanism of propellant mixing, atomization with simultaneous vaporization, and combustion is difficult to analyze, and performance of injectors must be evaluated within a rocket motor for each fuel-oxidizer system. It is difficult to duplicate rocket motor conditions by subjecting injectors to water tests or by checking their injection pattern with propellants without combustion. In the past, the type injector to be used for a given fuel-oxidant system has been determined by actual test.

Recent trends in injector design appear to be in the direction of violent mixing of the fuel and oxidizer because the majority of fuels used ignite more readily as a result of violent mixing and thus atomization.

I have discovered that certain liquid fuels ignite more readily and more efficiently when the fuel and oxidizer are brought together as gently as possible. I have devised an improved type of injector for liquid fuel rocket motors in which the fuel and oxidizer are introduced in a novel manner, so that gentle mixing occurs. This injector introduces the liquid propellants into the combustion chamber in parallel streams providing thorough mixing of the liquid propellants without violent splashing and atomization, and thus reduces ignition delay. This injector is designed to prevent deep penetration of the mixed propellants into the combustion chamber of the rocket; and, therefore, the injection pressure is maintained low with respect to the combustion chamber pressure.

The liquid fuels which I have found to give improved performance upon gentle mixing with the oxidizer include N-methyl-ethylsulfenamide, N-methyl-methylsulfenamide, triethyl tri-thiophosphite, mixture of methyl, ethyl, propyl, and butyl trithiophosphites, and the total product of the reaction of butadiene with ammonia in the presence of lithium hydride catalyst. The total product of the reaction of butadiene with ammonia, herein referred to as total aminated product, is a mixture of the approximate composition: 15 percent 2-butenyl amine, 5 percent di-(2-butenyl) amine, 40 percent tri-(2-butenyl) amine and 40 percent of a mixture of basic and non-basic polymeric materials. Other fuels which require gentle mixing with the oxidizers can also be used in this novel injector.

The oxidizers most commonly used in liquid bi-propellant rocket motors are white fuming nitric acid, usually denoted as WFNA and red fuming nitric acid usually denoted as RFNA. Other liquid oxidizers can be used in this novel injector.

Each of the following objects will be attained by at least one of the aspects of the invention.

It is an object of this invention to provide a method of operating a liquid bi-propellant rocket motor wherein the fuel used requires gentle mixing with the oxidizer.

It is another object to provide an improved rocket motor.

It is another object to provide an injector for a rocket motor which will introduce the fuel and oxidizer into the combustion chamber under conditions of gentle mixing.

Another object of the invention is to provide an injector for a rocket motor which will introduce the fuel and oxidizer to the combustion chamber without violent splashing and atomization.

Other and further objects and advantages will be apparent to one skilled in the art upon study of this disclosure and accompanying drawing.

A preferred form of the invention is shown in the drawings, in which:

Figure 1 is a schematic sectional view of a rocket motor;

Figure 2 is a vertical section of a portion of the injector;

Figure 3 is a vertical section of one modification of a portion of the injector;

Figure 4 is a view taken along lines 4—4 of Figure 1; and

Figure 5:
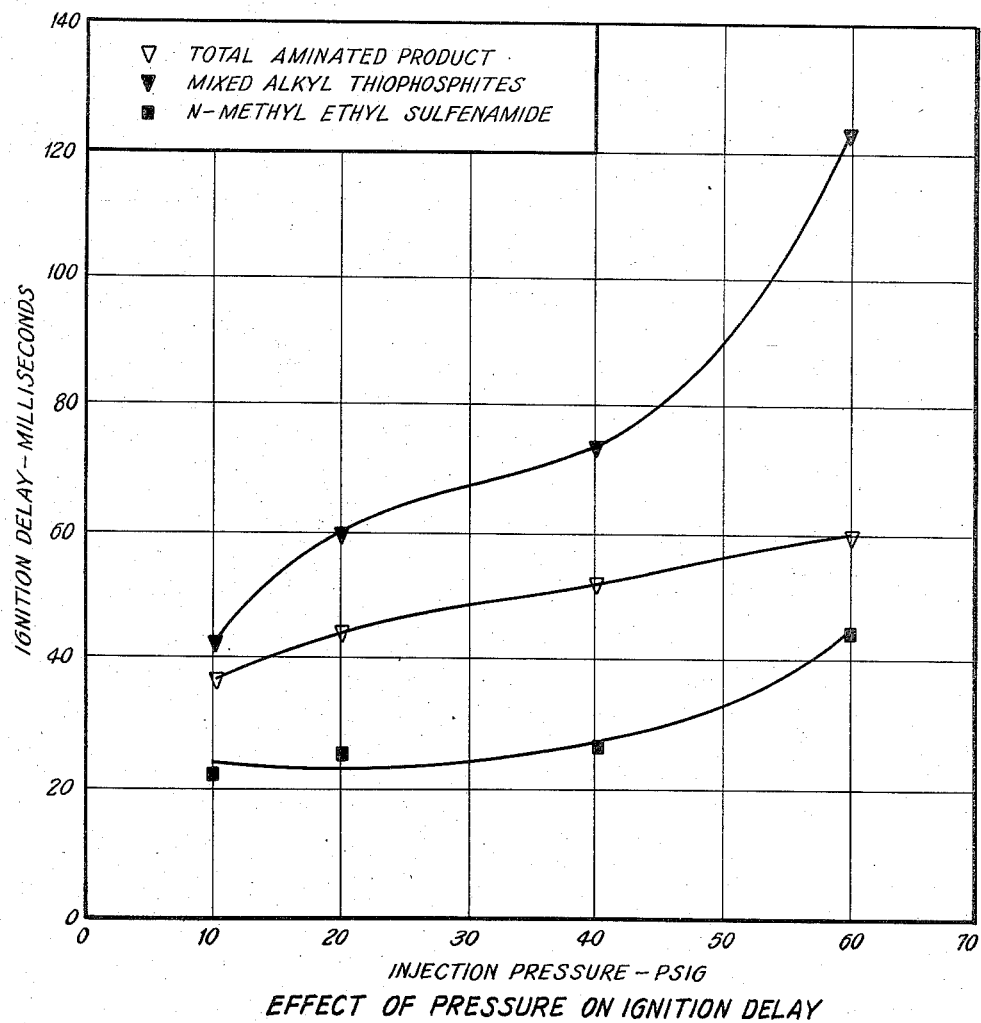
Figure 5 is a graphical representation of the effect of injection pressure on several liquid fuels.

Referring now particularly to Figure 1, a rocket motor comprising shell 11, nozzle section 12, combustion chamber 13, oxidizer supply 14 and fuel supply 15 is operated by passing fuel through the orifices 16 and oxidizer through the annular orifices 17 so that combustion occurs in combustion chamber 13. Pressure is applied to the fuel and oxidizer supply by a suitable means indicated by helium tank 18 and pistons 19. The pay load is carried in the forward portion of the rocket indicated at 20. Ignition of the fuel and oxidizer is obtained by the use of hypergolic fuels or an ignition means such as an electrical spark for fuels which are not hypergolic. The fuel orifice 16 of the injector is preferably circular in cross section and the oxidizer orifice is preferably an annular opening surrounding the fuel orifice. This is the preferred arrangement because the volume of oxidizer required for complete combustion of the fuel is greater than the volume of fuel. The oxidizer, however, can be supplied through the circular orifice and the fuel through the surrounding annular orifice provided the oxidizer is introduced at a rate greater than that of the fuel.

Figure 2 is a detailed view of the preferred arrangement of fuel and oxidizer orifice illustrating one device whereby adjacent and substantially parallel streams of oxidizer and fuel are introduced into the combustion chamber. The nozzle section communicating between the fuel and oxidizer inlets and the combustion chamber is indicated at 21.

Figure 3 illustrates a modification of the injector of this invention wherein the fuel and oxidizer are introduced tangentially into a common orifice so that the adjacent streams pass substantially parallel into the combustion chamber.

Figure 4 illustrates a preferred arrangement of a plurality of concentric orifices which make up the injector of this invention.

The following example illustrates my invention but is not to be construed as limiting my invention to the materials and procedure employed therein.

*Example*

Ignition delay tests have been conducted in the following manner. A small quantity of fuel (0.2 milliliters has been adopted as standard) is placed in the bottom of a test tube approximately 8 x 1 inches and 0.3 milliliters of white nitric acid oxidizer is injected into the fuel. A constant pressure nitrogen surge chamber furnishes a source of pressure to inject the oxidizer into the fuel. This nitrogen pressure can be varied over a considerable range of pressures. A solenoid coil actuates the injector by raising a pintle valve which seats on a Teflon gasket. The amount of oxidizer injected can also be varied over a wide range by adjusting the length of the electric pulse to the solenoid coil. The oxidizer temperature is maintained constant by circulating a coolant through a jacket surrounding the injection nozzle, while fuel temperature is maintained by a constant temperature bath in which the test tube is immersed. The ignition delay interval is taken as the time between contact of the oxidizer with the fuel and the presence of flame which is sensed by a photocell. The start of the ignition delay period is obtained by sensing the electric pulse to the solenoid coil and correcting the data for a practically constant time lag (6.3±1.5 milliseconds) for the oxidizer to reach the fuel. All runs were made at approximate 80° F.

Several fuels were evaluated according to the procedure outlined above, and the results of these tests on three fuels are shown graphically in Figure 5. As shown in Figure 5, an increase in acid injection pressure tended to increase the ignition delay of the three fuels tested. The increase in ignition delay is attributable to the increase in violent mixing caused by an increase in velocity of the acid stream due to increased pressure.

Good ignition delay characteristics were obtained with the fuels of Figure 5 when ampules of these fuels were broken beneath the surface of white fuming nitric acid. This procedure apparently provided the gentle mixing required by these materials whereas other materials tested by breaking an ampule of the fuel under the surface of the nitric acid oftentimes resulted in no ignition at all.

Those fuels require violent mixing and atomization in order to obtain ignition.

In the operation of the rocket motor of my invention, the fuel and oxidizer are introduced into the combustion chamber through the injector by means of pressure applied by the pressure source indicated by Figure 1 by the helium tank 18 which applies pressure to piston heads 19 thus forcing the fuels and oxidants through the orifices of the injector. Gentle and thorough mixing of the liquid fuel and liquid oxidizer takes place. A low pressure drop is preferred, preferably about 25 p. s. i. so as to prevent splashing and atomization. The velocity of the two-propellant streams is preferably different and thereby better and faster mixing occurs.

The injector of my invention is not to be limited to the propellants set forth in this application, but is applicable in any motor where fuels, which require gentle mixing, are used.

Variations and modifications are possible within the scope of the disclosure of this invention, the essence of which is the provision of a rocket motor wherein the fuel and oxidizer streams are introduced into the combustion in parallel and adjacent streams so that gentle mixing of fuel and oxidizer results.

What is claimed is:

1. The method of operating a continuous combustion power plant with a liquid oxidizer selected from the group consisting of white fuming nitric acid and red fuming nitric acid and a liquid fuel selected from the group consisting of N-methylethylsulfenamide, N-methylmethylsulfenamide, triethyl trithiophosphite, mixtures of methyl, ethyl, propyl and butyl trithiophosphites, and the total product of the reaction of butadiene with ammonia in the presence of lithium hydride catalyst which comprises introducing said fuel and said oxidizer into the combustion zone of the continuous combustion power plant in adjacent and substantially parallel streams at a pressure of 15 to 40 p. s. i. greater than the pressure in said combustion zone so that gentle mixing of the fuel and oxidizer results.

2. The method of claim 1 wherein the oxidizer stream surrounds the fuel stream as the two streams enter the combustion zone.

3. The method of claim 1 wherein the oxidizer stream and fuel stream are introduced into the combustion zone side-by-side.

References Cited in the file of this patent

UNITED STATES PATENTS

| | | |
|---|---|---|
| 2,397,834 | Bowman | Apr. 2, 1946 |
| 2,402,826 | Lubbock | June 25, 1946 |
| 2,540,665 | Goddard | Feb. 6, 1951 |
| 2,575,070 | Reed et al. | Nov. 13, 1951 |
| 2,625,007 | Truax | Jan. 13, 1953 |